Oct. 26, 1965

H. H. CHAMBERLAIN 3,214,708

FREQUENCY-TYPE TELEMETER TRANSMITTER

Filed March 28, 1962

INVENTOR.
HARVEY H. CHAMBERLAIN
BY
Irving M. Freedman
HIS ATTORNEY

United States Patent Office 3,214,708

Patented Oct. 26, 1965

3,214,708

FREQUENCY-TYPE TELEMETER TRANSMITTER

Harvey H. Chamberlain, Marblehead, Mass., assignor to General Electric Company, a corporation of New York Filed Mar. 28, 1962, Ser. No. 183,084
9 Claims. (Cl. 332—14)

Figure 1:
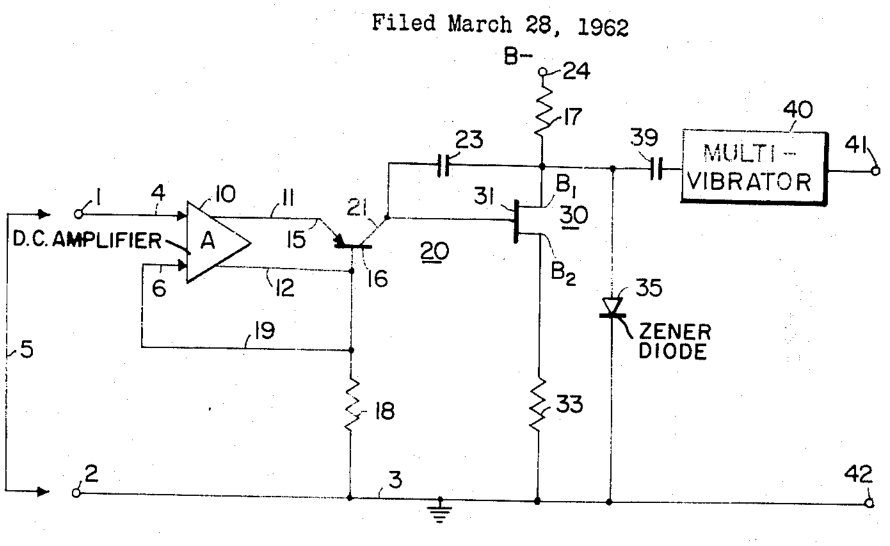

This invention relates to telemetering, and in particular, to an improved frequency-type of telemeter transmitter. Electrical signals representing both electrical and non-electrical variables are commonly transmitted to indicating and/or control equipment located at a remote point. In the frequency-type of telemetering system the electrical signals are converted to a frequency varying signal for ease of transmission over communication channels. The frequency of the transmitted signal in such systems is commonly in the range of 5 to 15 cycles or 6 to 27 cycles per second with direction and magnitude of the variation of the frequency representing variations of the variable. It is common practice to provide millivolt magnitude direct current electrical signals from converters or transducers which represent and vary in response to a variable under measurement or control, and to convert the millivolt signal to a frequency varying signal for transmission over the communication channels.

In order that the transmitted signal truly represents the variable being transmitted, it is necessary to provide a frequency-type of telemeter transmitter in which the frequency variations provided vary in response only to the variable and are not adversely affected by the transmitter circuitry. However, it is often necessary to amplify the millivolt input signal to a sufficiently high level for utilization in the generation of the frequency signal. Furthermore, proper stability and operation of such arrangements require that the amplifier be of the feedback type. A particularly bothersome problem encountered with such arrangements is the appearance of the frequency varying signal in the feedback signal which causes saturation and stability problems in the amplifier.

Because of such problems, it is known to filter the feedback signal which is compared to the input signal to provide the input to the amplifier. However, the use of filters in the feedback circuit introduces additional problems, particularly at the relatively low signal frequencies involved in frequency telemetering. The reactive filter elements, typically capacitors, not only must be undesirably large at such low frequencies but introduce a time delay to the feedback signal adversely affecting the response of the equipment. It is, of course, desirable to minimize the time lag of a servo system loop in order to minimize the response of the equipment to, for example, step changes of the variable.

It is an object of this invention to provide an improved frequency-type of telemeter transmitter for use at relatively low signal frequencies.

It is a further object of this invention to provide an improved frequency-type of telemeter transmitter to provide, from a relatively small input signal, frequency varying signals suitable for transmission over communication channels.

It is another object of this invention to provide an improved frequency-type of telemeter transmitter employing a feedback type of amplifier and having a relatively fast response characteristic.

It is still another object of this invention to provide an improved frequency-type of telemeter transmitter employing a feedback type of amplifier and including means of obtaining a feedback signal for the amplifier which is substantially free of the frequency signal components produced, while at the same time minimizing the time lag introduced in the feedback path.

Other objects and advantages of this invention will become apparent as the following description proceeds and the features and novelty which characterize the invention will be pointed out with particularity in the claims annexed to and forming a part of this specification.

In accordance with one form of the invention, in a frequency-type of telemeter transmitter particularly adapted for the provision of a relatively low frequency output signal which varies in response to a relatively small input signal, there is provided a feedback amplifier which produces an amplified direct current output signal which varies as the difference between the input and feedback signals. A common base transistor network has its emitter-base circuit connected to the output of the amplifier, and its collector-base circuit connected to a frequency generating circuit which provides an output frequency varying in accordance with the signal developed in the collector-base circuit. The feedback signal for the amplifier is developed in the collector-base circuit of the common base transistor. Means are provided to connect the output of the frequency generating circuit to a communication channel.

More particularly, the feedback signal is developed across an impedance in the collector-base circuiut of the common base transistor and is substantially free of the output frequency signal.

Yet more particularly, the frequency generating circuit comprises a unijunction transistor relaxation oscillation having the emitter and one base thereof in series with a capacitance connected to the collector of the common base transistor. The relaxation oscillator may be connected to a triggered oscillator such as a multivibrator to provide output frequency wave form more suitable for transmission over a communication channel.

Figure 2:
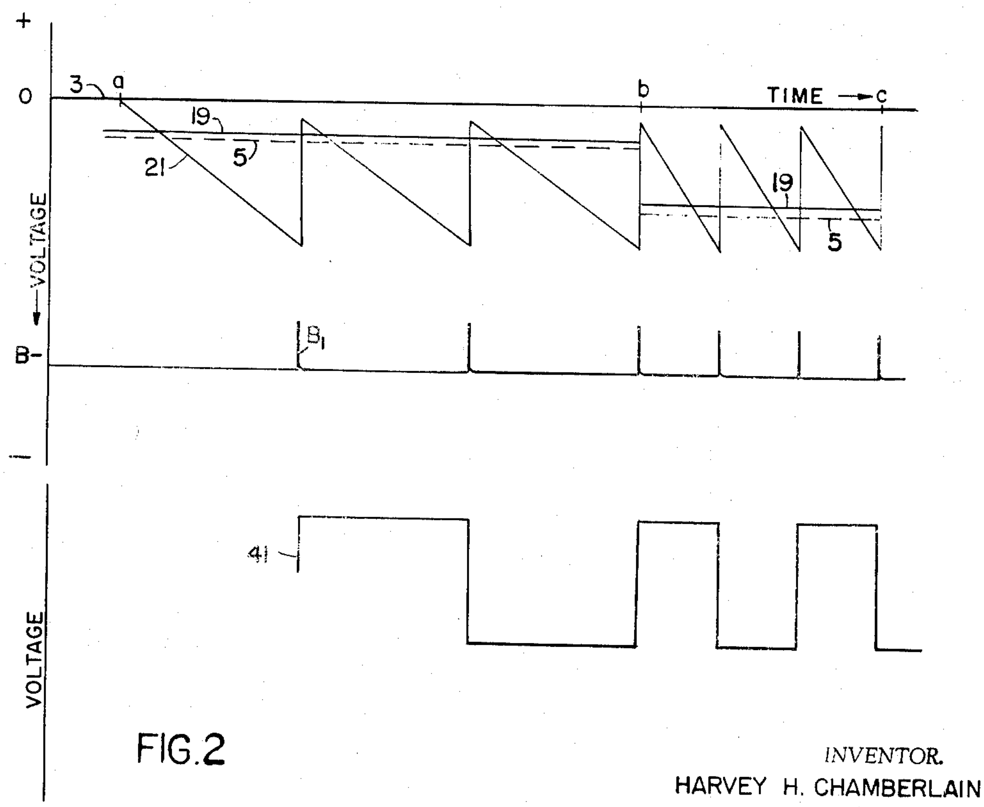

For a better understanding of this invention reference may be had to the following description taken in connection with the accompanying drawings in which:

FIG. 1 is a schematic representation of a preferred embodiment of the invention, partially shown in block diagram form; and FIG. 2 are wave forms useful in understanding the operation of the embodiment shown in FIG. 1.

Referring to the drawings, it is seen that the circuit includes a conventional high gain D.-C. amplifier 10 in a circuit including input terminals 1 and 2 to which the input signal 5 representing the variable is connected. Input terminal 2 connects directly to line 3 which may be grounded and which provides a common connection for the circuit. Input terminal 1 is connected to one input terminal 4 of amplifier 10. The output of amplifier 10 is provided across lines 11 and 12 which are connected to the emitter 15 and base 16, respectively, of the driver transistor 20. The base 16 is connected through the feedback resistor 18 to the common connection 3 and also through connection 19 to the other input terminal 6 of amplifier 10. Thus, the amplifier input signal is the difference between the input signal 5 which varies in response to the variable being monitored and the feedback signal developed across resistor 18. The collector electrode 21 of the driver transistor 20 is connected through capacitor 23 and resistor 17 to the B− supply 24, connected such that 24 is negative with respect to the common connection 3, and to the base $B_1$ of the unijunction transistor or double-base diode 30. The "double-base diode" has heretofore been described by Lesk, U.S. Patent 2,769,926, assigned to the assignee of the present invention. The collector 21 of the driver transistor 20 is also connected to the rectifying junction or emitter 31 of the unijunction transistor 30. The other base, $B_2$, of the unijunction transistor 30 is connected through a relatively small temperature compensating resistor 33, having a resistance in the order of 330 ohms, to the common connector 3.

$B_1$ is also connected through a Zener diode 35 directly to the common connector 3. The Zener diode may, for example, be of the type SV4018. Base $B_1$ is also connected through coupling capacitor 39 to the multivibrator 40.

The output signal for connection to the communication channel is provided at the output of the multivibrator 40 between terminal 41 and terminal 42 connected to the common collector 3. The communication channel to the telemeter receiver may be a telephone, radio, power line, or microwave channel in accordance with known techniques.

The input signal 5 is commonly provided by a transducer monitoring an electrical or nonelectrical variable and is conventionally a D.-C. signal having a magnitude in the order of millivolts. Variations in the input signal are amplified by the high gain stabilized direct current amplifier 10 having as its input the difference between the input signal and the feedback signal 19. The amplifier may, for example, be of a conventional type such as a chopper demodulator amplifier in which the D.-C. signal is converted to A.-C. through a chopper or switching circuit, subsequently amplified in an A.-C. amplifier and demodulated or rectified to provide an amplified D.-C. signal which varies in accordance with the amplifier input signal. A suitable amplifier is described by Williams, Jr., Tarpley, and Clark in an article entitled "D.-C. Amplifier Stabilized for Zero and Gain," appearing at pages 47–57 of volume 67, Transactions of the American Institute of Electrical Engineers (1948), or the amplifier may for example, be of the photoelectric galvanometer type described in my United States Patent 2,817,819, issued December 24, 1957, and assigned to the same assignee as the present invention. The amplified D.-C. signal is applied between the emitter 15 and base 16 of the driver transistor network 20 connected as a common base transistor circuit in which the output current flowing between the base 16 and collector 21 is proportional to the input or emitter current which varies as the output of the amplifier 10 and is essentially independent of the voltage applied to the collector 21; that is, the output current flowing from the base to the collector in the circuit including the feedback resistor 18 is one which is not affected by variations in the collector voltage. Thus, the feedback voltage developed across the resistor 18 varies as the output of the amplifier 10 and is compared with or subtracted from the input signal 5 to provide the amplifier input signal. This difference voltage is amplified to provide a feedback which will reduce the error signal or amplifier input signal.

The feedback resistor 18 should be in the base collector circuit of the transistor 20, but may be in series with the collector 21 rather than the base 16 as shown in FIG. 1.

Current flow in the base collector circuit of the driver transistor 20 charges capacitor 23 until the peak point voltage of the unijunction transistor 30 is reached causing the unijunction transistor to fire, discharging capacitor 23 through the base $B_1$ emitter circuit 31. This current flow modulates or affects the base $B_1$ to base $B_2$ current flow, which is reflected as a change in the voltage between $B_1$ and the common connection 3 providing a sharp pulse of the nature indicated by the wave form $B_1$ in FIG. 2 upon the firing of the unijunction transistor. Upon the discharge of the capacitor 23 through the unijunction transistor circuit, the capacitor again begins to charge at a rate determined by the output of amplifier 10 through the circuit including the feedback resistor 18, the base 16, and the collector 21 of the driver transistor 20, until the peak point of the unijunction transistor is again reached causing the capacitor to again discharge through the base $B_1$ emitter 31 circuit of the unijunction transistor, accompanied by another pulse appearing at $B_1$ relative to ground. The unijunction transistor circuit thus operates as a relaxation oscillator, and the peak point voltage is approximately one-half the value of the B− supply 24.

Referring to FIG. 2, it will be seen that in the time period *ab*, in which the input signal 5 is constant, the signal wave 21 form provided at collector 21 of the driver transistor, respectively increases in a negative direction toward B− during the charging of capacitor 23 followed by a rapid return toward ground potential providing a sharp pulse or spike at $B_1$ upon the discharge of capacitor 23. It is to be noted that the pulses $B_1$ are provided even in the presence of the Zener diode 35 which tends to maintain the average voltage between the base $B_1$ and common terminal 3 constant.

The pulses provided at the base $B_1$ of the unijunction transistor 30 are coupled through coupling capacitor 39 to the triggered multivibrator 40 to produce square-wave output pulses 41 of FIG. 2 having half the frequency of the pulses $B_1$. While the time reference of the pulses 41 of FIG. 2 corresponds to that used in the remainder of the figure, the amplitude of the pulses is not necessarily related voltage-wise to the same ground 3 as the rest of the wave forms. Also, the magnitudes of the input signal 5 and the feedback signal 19 are shown considerably enlarged relative to the other wave forms. The output pulses of the multivibrator 40 are commonly in the ranges of 5 to 15 cycles per second or 6 to 27 cycles per second. The square-wave pulses are preferable to the sharp pulses $B_1$ for transmission over communication channels since the fundamental frequency constitutes a major part of the signal. Of course, the multivibrator 40 could be replaced by other circuits to provide an output relatively free from harmonics. The multivibrator 40 is preferably of the transistorized type such as that shown, for example, at pages 118 and 119 and FIG. 11.7, General Electric Transistor Manual, fifth edition, published 1960 by the Semiconductor Products Department of the General Electric Company; or the bistable multivibrator shown in section 193, and FIGURE 198, pages 202 to 205 of TM 11–690, Basic Theory and Application of Transistors, published by Department of the Army, March 1959.

During the time period *bc* of FIG. 2, it is to be noted that the input signal 5 goes through a step change to a higher amplitude. During such a period the frequency of the charge and discharge of capacitor 23 increases as indicated by the wave form 21, and accordingly the pulses $B_1$ and the output 41 of the multivibrator also increase to provide a higher frequency signal as shown in the wave forms of FIG. 2.

It is to be noted the feedback voltage 19 is developed across the feedback resistor 18 by current flow in the common base driver transistor circuit, which current flow is independent of the collector 21 voltage variations and which current flow varies as the frequency variations developed by the unijunction transistor 30, since it is this current flow which determines the rate of charge of capacitor 23 and hence the firing rate of the unijunction transistor. The current through the feedback resistor 18 is essentially free of the frequency varying signal provided by the unijunction transistor 30 and the multivibrator 40 such that troublesome signal currents are not present in the feedback voltage and do not appear at the amplifier to provide problems of saturation and stability. Since the amplifier input is the difference between the input signal 5 and the feedback voltage 19, it may be relatively small, such that signal currents, if present, could be of relatively large amplitude relative to the amplifier input signal. Accordingly, little or no filtering is required of the feedback signal minimizing the time lag in the servoloop and making possible the attainment of desirable rapid response of the equipment to changes in the input signal 5.

The temperature compensating resistor 33 compensates for temperature changes of the unijunction transistor 30, Zener diode 35, and capacitor 23 to minimize the effects of temperature on the output signal. Alternatively, the unijunction transistor, Zener diode, and capacitor could be physically located within a temperature controlled oven to prevent temperature variations thereof.

If it is desired to have a fixed frequency output signal in the presence of zero input signal, a suitable source of direct current voltage can be inserted in series with the input terminal 1.

The relaxation oscillator network could use the so-called Shockley 4-layer diode instead of the unijunction transistor 30.

Therefore, while particular embodiments of the subject invention have been shown and described herein, they are in the nature of description rather than limitation and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. In a frequency-type of telemeter transmitter particularly adapted for the provision of a relatively low frequency output signal which varies in response to a relatively small direct current input signal, a direct current amplifier providing an amplified output signal which varies as a function of the current flowing in its input circuit, a common base transistor network having the emitter-base circuit thereof connected to the output of said amplifier, and the collector-base circuit thereof connected to a frequency generating circuit, said frequency generating circuit providing an output frequency which varies in accordance with the signal current flowing in said collector-base circuit, said signal current varying in magnitude in response to variations in magnitude of said amplified output signal, means coupled to said collector-base circuit of said common base transistor stage for developing a feedback signal proportional to said signal current, means connected to said input circuit for obtaining a current flow therein which is equal to the difference between said input and feedback signals, and means to connect the output of said frequency generating circuit to a communication channel.

2. In a frequency-type of telemeter transmitter particularly adapted for the provision of a relatively low frequency output signal which varies in response to a relatively small direct current input signal, a direct current amplifier providing an amplified output signal which varies as a function of the current flowing in its input circuit, a common base transistor network having the emitter-base circuit thereof connected to the output of said amplifier, and the collector-base circuit thereof connected to a frequency generating circuit, said frequency generating circuit providing an output frequency which varies in accordance with the signal current flowing in said collector-base circuit, said signal current varying in magnitude in response to variations in magnitude of said amplified output signal, an impedance located at a point in said collector-base circuit of said common base transistor that is substantially free of the output frequency signal for developing a feedback signal, means connected to said input circuit for obtaining a current flow therein which is equal to the difference between said input and feedback signals, and means to connect the output of said frequency generating circuit to a communication channel.

3. In a frequency-type of telemeter transmitter particularly adapted for the provision of a relatively low frequency output signal which varies in response to a relatively small direct current input signal, a direct current amplifier providing an amplified output signal which varies as a function of the current flowing in its input circuit, a common base transistor network having the emitter-base circuit thereof connected to the output of said amplifier, and the collector-base circuit thereof connected to a frequency generating circuit, said frequency generating circuit providing an output frequency which varies in accordance with the signal current flowing in said collector-base circuit, said frequency generating circuit comprising a unijunction transistor having the emitter and one base thereof connected to the collector of said common base transistor, said signal current varying in magnitude in response to variations in magnitude of said amplified output signal, means coupled to said collector-base circuit of said common base transistor for developing a feedback signal proportional to said signal current, means connected to said input circuit for obtaining a current flow therein which is equal to the difference between said input and feedback signals, and means to connect the output of said frequency generating circuit to a communication channel.

4. In a frequency-type of telemeter transmitter particularly adapted for the provision of a relatively low frequency output signal which varies in response to a relatively small direct current input signal, a direct current amplifier providing an amplified output signal which varies as a function of the current flowing in its input circuit, a common base transistor network having the emitter-base circuit thereof connected to the output of said amplifier, and the collector-base circuit thereof connected to a frequency generating circuit, said frequency generating circuit providing an output frequency which varies in accordance with the signal current flowing in said collector-base circuit, said frequency generating circuit comprising a unijunction transistor having the emitter, and one base thereof in series with a capacitance, connected to the collector of said common base transistor, said signal current varying in magnitude in response to variations in magnitude of said amplified output signal, an impedance located at a point in said collector-base circuit of said common base transistor that is substantially free of the output frequency signal for developing a feedback signal, means connected to said input circuit for obtaining a current flow therein which is equal to the difference between said input and feedback signals, and means to connect the output of said frequency generating circuit to a communication channel.

5. In a frequency-type of telemeter transmitter particularly adapted for the provision of a relatively low frequency output signal which varies in response to a relatively small direct current input signal, a direct current amplifier providing an amplified output signal which varies as a function of the current flowing in its input circuit, a common base transistor network having the emitter-base circuit thereof connected to the output of said amplifier, and the collector-base circuit thereof connected to a frequency generating circuit, said frequency generating circuit providing an output frequency which varies in accordance with the signal current flowing in said collector-base circuit, said frequency generating circuit comprising a unijunction transistor relaxation oscillator having the emitter, and one base thereof in series with a capacitance, connected to the collector of said common base transistor, said signal current varying in magnitude in response to variations in magnitude of said amplified output signal, said relaxation oscillator being coupled to a triggered oscillator to provide an output wave form suitable for transmission over communication channels, an impedance located at a point in said collector-base circuit of said common base transistor that is substantially free of the output frequency signal for developing a feedback signal, means connected to said input circuit for obtaining a current flow therein which is equal to the difference between said input and feedback signals, and means to connect the output of said frequency generating circuit to a communication channel.

6. In a frequency-type of telemeter transmitter particularly adapted for the provision of a relatively low frequency output signal which varies in response to a relatively small direct current input signal, a direct current amplifier providing an amplified output signal which varies as a function of the current flowing in its input circuit, a common base transistor network having the emitter-base circuit thereof connected to the output of said amplifier, and the collector-base circuit thereof connected to a frequency generating circuit, said frequency generating circuit providing an output frequency which varies in accordance with the signal current flowing in said collector-base circuit, said frequency generating circuit comprising a unijunction transistor relaxation oscillator having the emitter, and one base thereof in series with a capacitance, connected to the collector of said common base transistor, said signal current varying in magnitude in response to variations in magnitude of said amplified output signal, said relaxation oscillator being coupled to a triggered oscillator to provide an output wave form suitable for transmission over communication channels, said triggered oscillator being of the multivabrator type and furnishing susbtantially square-wave output signals, an impedance located at a point in said collector-base circuit of said common base transistor that is substantially free of the output frequency signal for developing a feedback signal, means connected to said input circuit for obtaining a current flow therein which is equal to the difference between said input and feedback signals, and means to connect the output of said frequency generating circuit to a communication channel.

7. In a frequency-type of telemeter transmitter particularly adapted for the provision of a relatively low frequency output signal which varies in response to a relatively small direct current input signal, a direct current amplifier providing an amplified output signal which varies as a function of the current flowing in its input circuit, a common base transistor network having the emitter-base circuit thereof connected to the output of said amplifier, and the collector-base circuit thereof connected to a frequency generating circuit, said frequency generating circuit providing an output frequency which varies in accordance with the signal current flowing in said collector-base circuit, said frequency generating circuit comprising a unijunction transistor relaxation oscillator having the emitter, and one base thereof in series with a capacitance, connected to the collector of said common base transistor, said signal current varying in magnitude in response to variations in magnitude of said amplified output signal, and a Zener diode connected in circuit across the bases thereof with the frequency varying signal being developed at said one base, an impedance located at a point in said collector-base circuit of said common base transistor that is substantially free of the output frequency signal for developing a feedback signal, means connected to said input circuit for obtaining a current flow therein which is equal to the difference between said input and feedback signals, and means to connect the output of said frequency generating circuit to a communication channel.

8. In a frequency-type of telemeter transmitter particularly adapted for the provision of a relatively low frequency output signal which varies in response to a relatively small direct current input signal, a direct current amplifier providing an amplified output signal which varies as a function of the current flowing in its input circuit, a common base transistor network having the emitter-base circuit thereof connected to the output of said amplifier, and the collector-base circuit thereof connected to a frequency generating circuit, said frequency generating circuit providing an output frequency which varies in accordance with the signal current flowing in said collector-base circuit, said frequency generating circuit comprising a unijunction transistor relaxation oscillator having the emitter, and one base thereof in series with a capacitance, connected to the collector of said common base transistor, said signal current varying in magnitude in response to variations in magnitude of said amplified output signal, and a Zener diode connected in circuit across the bases thereof with the frequency varying signal being developed at said one base, and means to compensate for temperature variations of said relaxation oscillation, an impedance located at a point in said collector-base circuit of said common base transistor that is substantially free of the output frequency signal for developing a feedback signal, means connected to said input circuit for obtaining a current flow therein which is equal to the difference between said input and feedback signals, and means to connect the output of said frequency generating circuit to a communication channel.

9. In a frequency-type of telemeter transmitter particularly adapted for the provision of a relatively low frequency output signal which varies in response to a relatively small direct current input signal, a direct current amplifier providing an amplified output signal which varies as a function of the current flowing in its input circuit, a constant current source, said source having an input control circuit connected to the output of said amplifier so as to provide a D.-C. current in its output circuit the magnitude of which varies in response to variations in said amplified output signal, a frequency generating circuit coupled to the output of said current source, said frequency generating circuit providing an output frequency which varies in response to the variations in magnitude of said D.-C. output current, a feedback impedance connected in said output circuit of said current source so that it is traversed solely by said D.-C. output current, and means for coupling the feedback signal developed across said feedback impedance to said amplifier input circuit so that a current equal to the difference between said input and feedback signals flows in said input circuit.

References Cited by the Examiner

UNITED STATES PATENTS 3,060,388 10/62 Ball ------------------ 331—111

OTHER REFERENCES

"G.E." Controlled Rectifier Manual, 1st Ed., 1960, General Electric Co., page 62 showing Figs. 4–20 relied on.

ROY LAKE, *Primary Examiner.*

THOMAS B. HABECKER, *Examiner.*